United States Patent
Davidson et al.

(10) Patent No.: US 12,524,186 B1
(45) Date of Patent: Jan. 13, 2026

(54) VISUAL OUTPUT CONTROL FOR HEAD-MOUNTABLE DEVICES

(71) Applicant: Apple Inc., Cupertino, CA (US)

(72) Inventors: Daniel S. Davidson, Mill Creek, WA (US); Evan W. Mattingly, Vashon, WA (US); Paul X. Wang, Cupertino, CA (US); Trevor J. Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/081,984

(22) Filed: Mar. 17, 2025

(51) Int. Cl.
  G06F 3/14 (2006.01)
  G02B 27/01 (2006.01)
  G06F 3/01 (2006.01)

(52) U.S. Cl.
  CPC .............. G06F 3/14 (2013.01); G02B 27/017 (2013.01); G06F 3/013 (2013.01)

(58) Field of Classification Search
  CPC ........ G06F 3/013; G06F 3/014; G02B 27/017
  See application file for complete search history.

(56) References Cited

U.S. PATENT DOCUMENTS

| | | | | |
|---|---|---|---|---|
| 10,228,562 | B2 * | 3/2019 | Stafford | G02B 27/0172 |
| 10,502,959 | B2 * | 12/2019 | Stafford | G02B 27/0093 |
| 11,093,208 | B2 * | 8/2021 | Hudman | G06F 3/147 |
| 11,422,620 | B2 * | 8/2022 | Vlaskamp | G06F 3/011 |
| 11,551,376 | B2 * | 1/2023 | Zachrisson | G06T 7/74 |
| 11,822,718 | B2 * | 11/2023 | Vlaskamp | H04N 13/383 |
| 12,105,875 | B2 * | 10/2024 | Vlaskamp | G02B 27/0093 |
| 12,429,946 | B2 * | 9/2025 | Vlaskamp | G09G 5/38 |
| 2015/0077312 | A1 * | 3/2015 | Wang | G09G 3/02 345/7 |
| 2016/0091720 | A1 * | 3/2016 | Stafford | G02B 27/0172 345/8 |
| 2016/0238852 | A1 * | 8/2016 | Ellsworth | G09G 5/006 |
| 2019/0250409 | A1 * | 8/2019 | Stafford | G02B 27/0093 |
| 2021/0181840 | A1 * | 6/2021 | Vlaskamp | G02B 27/0093 |
| 2022/0121237 | A1 * | 4/2022 | VanBlon | G06F 1/163 |
| 2022/0391013 | A1 * | 12/2022 | Vlaskamp | H04N 13/327 |
| 2024/0004459 | A1 | 1/2024 | Wang et al. | |
| 2024/0036645 | A1 * | 2/2024 | Vlaskamp | G09G 5/38 |
| 2024/0419243 | A1 * | 12/2024 | Vlaskamp | G09G 5/38 |

FOREIGN PATENT DOCUMENTS

| | | |
|---|---|---|
| WO | WO 2022/066350 | 3/2022 |
| WO | WO 2023/048985 | 3/2023 |

* cited by examiner

Primary Examiner — Michael Pervan
(74) Attorney, Agent, or Firm — BAKERHOSTETLER

(57) ABSTRACT

Systems of the present disclosure can provide a head-mountable device with interface elements to provide output of adjusted visual content. The head-mountable device and/or another electronic device can be operated to detect features of a user and/or features of the head-mountable device to determine alignment data corresponding to the alignment of the eyes with the displays. The head-mountable device and/or the other electronic device can be operated to determine adjustment data that indicates whether the user's perception of the visual content will differ between the fields of view of the eyes. The adjustment data can further indicate how output of the visual content can be adjusted so that the portions of the visual content that are output with the displays omits differences that would interfere with the user's perception of the visual content.

20 Claims, 9 Drawing Sheets

VISUAL OUTPUT CONTROL FOR HEAD-MOUNTABLE DEVICES

TECHNICAL FIELD

The present description relates generally to head-mountable devices, and, more particularly, to visual output control of head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
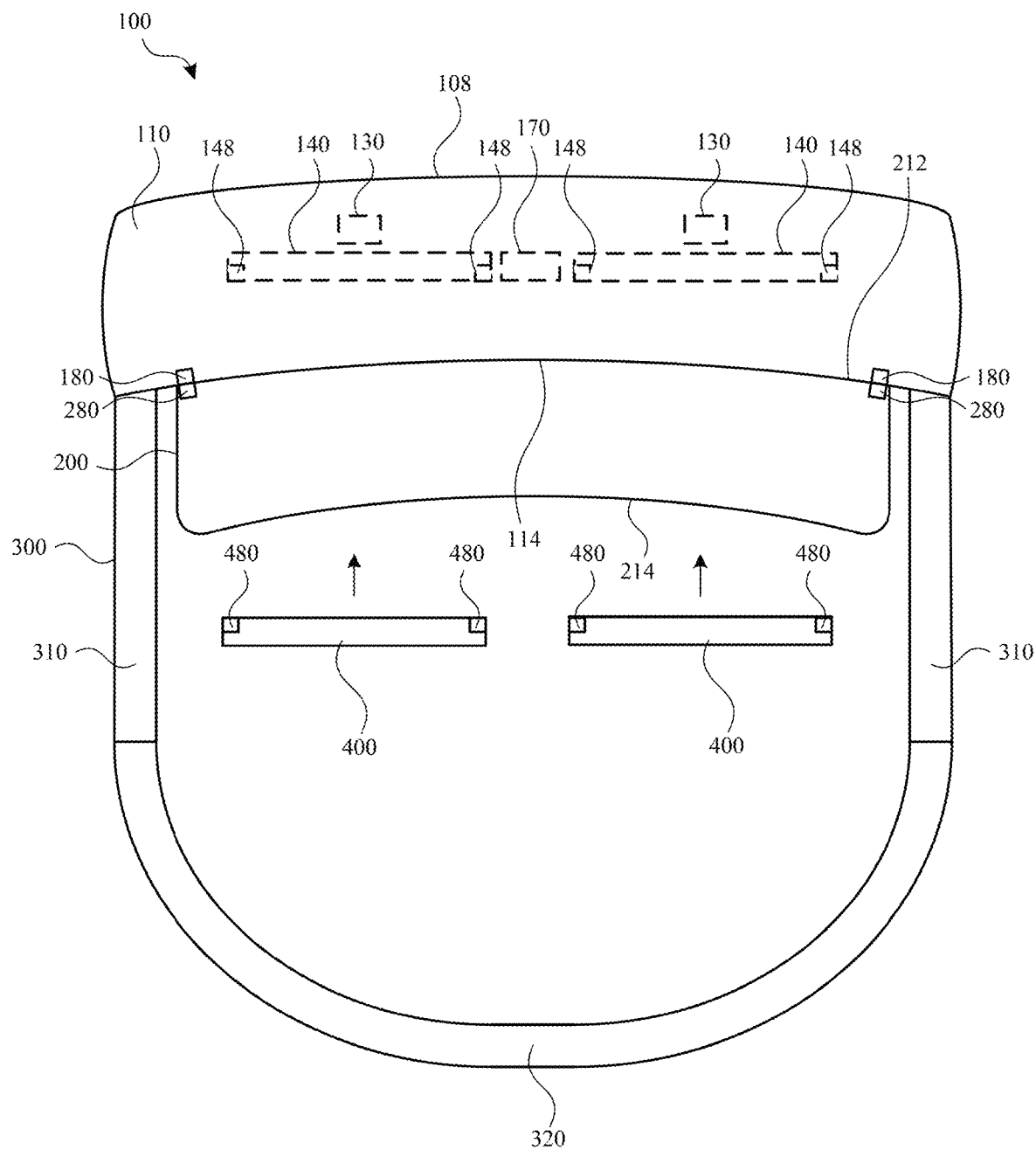
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. Interactive systems including head-mountable devices can include multiple parts, such as a head-mountable device that interacts with an electronic device.

Many of the functions performed by a head-mountable device are optimally experienced when the components are in their most preferred position and orientation with respect to a user wearing the head-mountable device. For example, the head-mountable device can include a display that visually outputs display-based information toward the eyes of the user. The position and orientation of the displays relative to the eyes depends, at least in part, on how the head-mountable device is positioned on the face of the user.

In some instances, a head-mountable device may not be worn with the displays in an ideal position and/or orientation relative to the respective eyes. Where a misalignment is present, the user wearing the head-mountable device may perceive optical effects that are not representative of the intended visual output. For example, visual artifacts, such as rivalry and/or luning, may occur as the eyes of the user perceive the respective displays differently. A head-mountable device may provide adjustments and/or corrections to limit or eliminate these visual effects even when the displays are not in a preferred alignment with respect to the eyes.

Systems of the present disclosure can provide a head-mountable device with interface elements to provide output of adjusted visual content. The head-mountable device and/ or another electronic device can be operated to detect features of a user and/or features of the head-mountable device to determine alignment data corresponding to the alignment of the eyes with the displays. The head-mountable device and/or the other electronic device can be operated to determine adjustment data that indicates whether the user's perception of the visual content will differ between the fields of view of the eyes. The adjustment data can further indicate how output of the visual content can be adjusted so that the portions of the visual content that are output with the displays omits differences that would interfere with the user's perception of the visual content.

These and other embodiments are discussed below with reference to FIGS. 1-14. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110. The frame 110 can be worn on a head of a user. For example, the frame 110 can be positioned in front of the eyes of a user to provide information within a field of view of the user. In some embodiments, the head-mountable device 100 includes a face engager 200.

The frame 110 can be supported on a user's head with a head engager 300. In some embodiments, the head engager 300 includes one or more (e.g., two) arms 310 extending from opposing sides of the frame 110. The arms 310 can wrap around or extend along opposing sides of a user's head. In some embodiments, the head engager 300 includes a band 320 connecting the arms 310 to each other. In some embodiments, the band 320 can be omitted, and the arms 310 can define respective terminal ends of the head engager 300. For example, the head engager 300 can optionally include earpieces for wrapping around, engaging with, or resting on a user's ears. In some embodiments, the arms 310 can each have a first end connected to the frame 110 and/or the face engager 200 and a second end, opposite the first end, that is a free end (e.g., defining a terminal end and/or not connected to another structure). It will be appreciated that other configurations can be applied for securing the head-mountable device 100 to a user's head. For example, one or more bands, straps, belts, caps, hats, or other components can be used in addition to or in place of the illustrated components of the head engager 300. By further example, the head engager 300 can include multiple components to engage a user's head. The head engager 300 can extend from the frame 110 and/or the face engager 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the head engager 300 (e.g., the arms 310 and/or the band 320), the face engager 200, and/or the frame 110 of the head-mountable device 100.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include displays 140 that provide visual output for viewing by a user wearing the head-mountable device 100. One or more displays 140 can be positioned on or near an inner side 114 of the frame 110. As used herein, an inner side 114 of a portion of a head-mountable device is a side that faces toward the user and/or away from the external environment.

A display 140 can transmit light from a physical environment (e.g., as captured by a camera) for viewing by the user. Such a display 140 can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As further shown in FIG. 1, a user sensor 170 can perform user detection, facial feature detection, facial movement detection, facial recognition, eye tracking, user mood detection, user emotion detection, voice detection, etc. Such eye tracking may be used to determine a location of information to be displayed on the displays 140 and/or a portion (e.g., object) of a view to be analyzed by the head-mountable device 100. By further example, the user sensor 170 can be a bio-sensor for tracking biometric characteristics, such as health and activity metrics. The user sensor 170 can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

As further shown in FIG. 1, the face engager 200 can define an interior space through which light can pass, thereby providing to the user wearing the head-mountable device 100 a view of displays 140 of the frame 110. Such a view can be enhanced by preventing the ingress of light from the external environment and into the face engager 200. While the face engager 200 is shown schematically with a particular size and shape, it will be understood that the size and shape of the face engager 200 (e.g., at the outer side 212 and/or the inner side 214 of the face engager 200), can have a size and shape that accommodates the face of a user wearing the head-mountable device 100. For example, the inner side 214 can provide a shape that generally matches the contours of the user's face around the eyes of the user. The inner side 214 can be provided with one or more features that allow the face engager 200 to conform to the face of the user to enhance comfort and block light from entering the face engager 200 at the point of contact with the face. For example, the inner side 214 can provide a flexible, soft, elastic, and/or compliant structure. In some embodiments, the face engager 200 is omitted, and the frame 110 engages a user directly (e.g., with one or more nosepieces).

Attachment elements can facilitate coupling of the frame 110 to the face engager 200 in a relative position and orientation that aligns the displays 140 of the frame 110 in a preferred position and orientation for viewing by the user. The frame 110 and the face engager 200 can be coupled to prevent ingress of light from an external environment. For example, frame connectors 180 can releasably engage face engager connectors 280. One or more of various mechanisms can be provided to secure the components to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the face engager 200 together. The components can remain secured to each other until an optional release mechanism is actuated. The release mechanism can be provided on an outer surface of the head-mountable device 100 for access by a user.

As further shown in FIG. 1, one or more lens assemblies 400 can be included and provide one or lenses for providing corrective vision capabilities. It will be understood that, where multiple lenses are used, the lens assemblies 400 can be provided together or separately (e.g., for combination).

The one or more lens assemblies 400 can provide one or more types of optical effects and/or vision correction. Lens assemblies 400 can include other optical components as required to produce a desired optical effect. For example, lens assemblies 400 can provide vision correction to light as appropriate for a given user. Such correction can be spherical, aspheric, atoric, cylindrical, single vision, multifocal, progressive, and/or adjustable. By further example, lens assemblies 400 can include one or more diffusers, filters, polarizers, prisms, beam splitters, diffraction gratings, mirrors, and/or windows. The differences in correction or other effects among lenses of different lens assemblies 400 can include variations in type of correction, diopter power, axis of correction, and the like. Various combinations of corrections can be provided with different lens assemblies 400. For example, each of the lenses of any given lens assembly 400 can have a known type of correction based on the identity thereof. Corresponding identifiers, such as stock keeping units ("SKU"), can be assigned for reference and to facilitate selection of a lens assembly 400 for a given user. Accordingly, different users can use different lens assemblies 400 and/or no lens assembly 400 as desired.

The lens assemblies 400 can be directly coupled to respective displays 140. For example, as shown in FIG. 1, the lens assemblies 400 can each include one or more lens assembly connectors 480, and the displays 140 can include one or more display connectors 148. The lens assembly connectors 480 of the lens assemblies 400 can releasably couple to respective display connectors 148 of the displays 140. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof can be included. The coupled components can remain secured to each other until an optional release mechanism is actuated. The release mechanism can be provided for access by a user.

Figure 2:
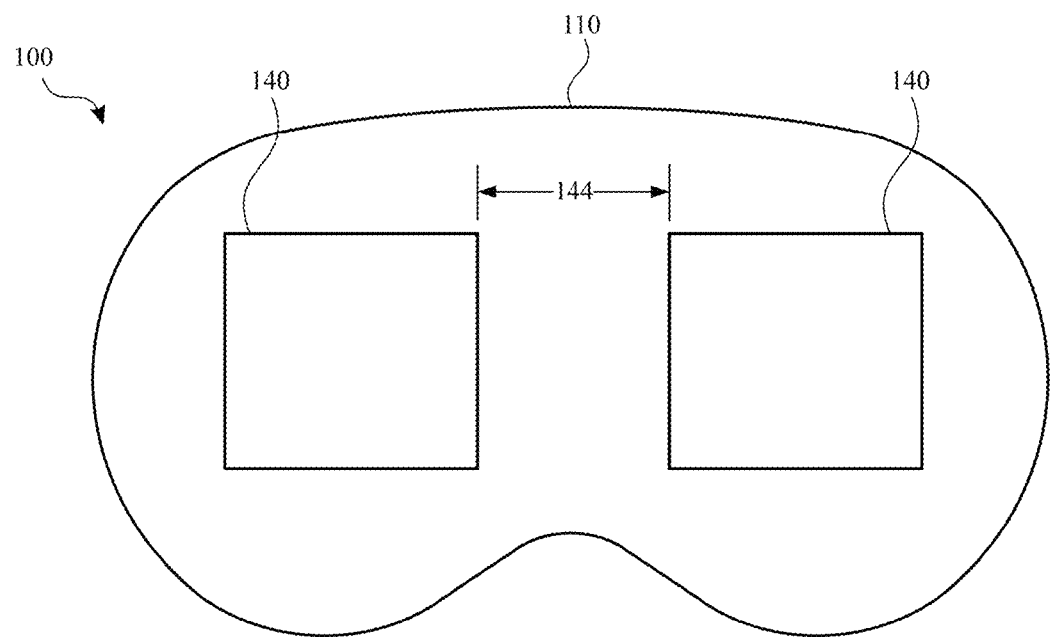
FIG. 2 illustrates a front view of the head-mountable device of FIG. 1, according to some embodiments of the present disclosure.

Referring now to FIG. 2, a head-mountable device can include a frame and one or more displays for outputting visual content. In some embodiments, a pair of displays 140 are mounted to the frame 110 and separated by a distance. The distance 144 between the pair of displays 140 can be designed to correspond to the interpupillary distance ("IPD") of a user. IPD is defined as the distance between the centers of the pupils of a user's eyes. The distance 144 between the displays 140 be provided to account for different IPDs of different users that may wear the head-mountable device 100.

In some embodiments, either or both of the displays 140 may be movably mounted to the frame 110 to permit the displays 140 to move or translate laterally to make the distance 144 larger or smaller. Any type of manual or automatic mechanism may be used to permit the distance 144 between the displays 140 to be an adjustable distance. For example, the displays 140 can be mounted to the frame 110 via slidable tracks or guides that permit manual or electronically actuated movement of one or more of the displays 140 to adjust the distance 144 there between. By further example, each display 140 can be adjustable to align with a respective eye of the user. For example, each display 140 can be moved along one or more axes until a center of each display 140 is aligned with a center of the respective eye. Accordingly, the distance 144 between the displays 140 can be set based on an interpupillary distance of the user.

In some embodiments, the displays 140 may be fixedly mounted to the frame 110 such that the distance 144 is fixed. A variety of frames 110 can be provided with different distances 144 separating the respective pair of displays 140 thereof. An appropriate frame 110 can be selected based on the distance 144 provided to accommodate the interpupillary distance of the user.

Figure 3:
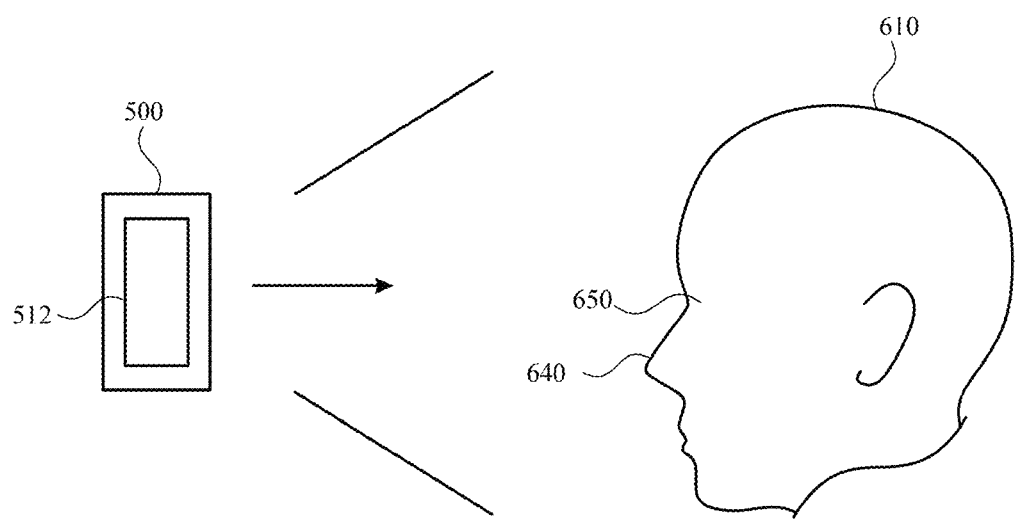
FIG. 3 illustrates a side view of an electronic device in use to measure features of a user, according to some embodiments of the present disclosure.

Referring now to FIG. 3, a device having a sensor can be operated to detect and/or measure one or more features of a head of a user. Such detections and measurements can be used to determine an assembly of a head-mountable device that will achieve a desired fit with respect to the head of the user.

As shown in FIG. 3, an electronic device 500 or another electronic device (e.g., a head-mountable device 100) can provide a sensor 512 that is operable to measure distances to multiple regions of the face of a user 610. Such regions can include the regions that would be engaged by a frame and/or arms of a head-mountable device when the head-mountable device is worn by the user. For example, the regions can include one or both eyes 650 and/or a nose 640 of the user 610. By further example, one or more additional regions of the user can be measured, including cheeks, forehead, hair, temples, ears, and the like.

The sensor 512 can include one or more types of sensors. For example, the sensor 512 can include one or more image sensors, depth sensors, thermal (e.g., infrared) sensors, and the like. By further example, a depth sensor can be configured to measure a distance (e.g., range) to an object (e.g., region of the user's head) via stereo triangulation, structured light, time-of-flight, interferometry, and the like. Additionally or alternatively, the sensor and/or the device can capture and/or process an image based on one or more of hue space, brightness, color space, luminosity, and the like.

In FIG. 3, by way of example, the sensor 512 is depicted as a component of the electronic device 500. The electronic device 500 can be or operate in concert with a portable computing device, a tablet device, a laptop computer, a smartphone, a smart watch, or other appropriate devices that include one or more sensors. The electronic device 500 can be maintained at a fixed location with respect to the user 610, and/or the electronic device 500 can be moved to map different regions of the head of the user 610.

In some embodiments, the sensor 512 measures one or more distances to the nose 640 and/or other regions of the user 610. Based on such measurements, the location, shape, size, width, length, and/or angle of the nose 640 can be calculated. The features of the nose 640 and/or other facial features can contribute to how the displays of a head-mountable device will be aligned (e.g., with relative position and/or orientation) with respect to the eyes 650 of the user 610. For example, where the head-mountable device rests on the nose 640 and/or other facial features, variation in the size and/or shape of the nose 640 across different users contributes to variations in the alignment of the displays with respect to the eyes of different users. Based at least in part on the measurements of the nose 640 and/or other facial features, alignment data can be determined to indicate the expected position and/or orientation of the displays of the head-mountable device relative to the eyes when the head-mountable device is in use (e.g., worn by the user 610).

In some embodiments, the sensor 512 measures a distance to one or both eyes 650 of the user 610. Based on such measurements, the distance between the eyes 650 (e.g., interpupillary distance) can be calculated. Based on such measurements, the position and/or orientation of the eyes 650 with respect to other facial features (e.g., the nose 640) can be calculated. The features of the eyes 650 can contribute to how the displays of a head-mountable device will be aligned (e.g., with relative position and/or orientation) with respect to the eyes 650 of the user 610. For example, where the head-mountable device rests on the nose 640 and/or other facial features, variation in the positions of the eyes 650 across different users contributes to variations in the alignment of the displays with respect to the eyes of different users. Based at least in part on the measurements of the eyes 650 and/or other facial features, alignment data can be determined to indicate the expected position and/or orientation of the displays of the head-mountable device relative to the eyes when the head-mountable device is in use (e.g., worn by the user 610).

In some embodiments, the sensor 512 measures any other regions of the head, optionally including portions that are not to be directly engaged by the head-mountable device. Additionally or alternatively, one or multiple distance measurements can be made to each of various regions, such as with respect to multiple sections of one or both of the eyes 650 and/or the nose 640 of the user 610.

The electronic device 500 or another electronic device (e.g., a head-mountable device 100) can operate the sensor 512 to detect and/or measure distances to multiple regions of a head-mountable device (e.g., the head-mountable device of FIGS. 1 and 2). Such regions can include the regions (e.g., a frame and/or arms) that would engage the user 610 when the head-mountable device is worn by the user. Such regions can include the displays, lens assemblies, and/or other components that contribute to the position and/or orientation of the displays when the head-mountable device is worn by the user.

In some embodiments, the sensor 512 measures one or more distances to the face engager and/or other user-engaging components of the head-mountable device. In some embodiments, the sensor 512 detects and/or identifies the face engager of the head-mountable device. For example, the sensor 512 can identify one or more visible features (e.g., barcode, label, icon, QR code) of the face engager. By further example, the sensor 512 can communicate (e.g., wirelessly) with a component (e.g., RFID tag, NFC tag, and the like) of the face engager. Based on such measurements and/or identifications, the location, shape, size, width, length, and/or angle of the face engager can be calculated and/or otherwise determined. The selection (and/or absence) of the face engager and its features can contribute to how the displays of a head-mountable device will be aligned (e.g., with relative position and/or orientation) with respect to the eyes 650 of the user 610. For example, where the head-mountable device rests on the nose 640 and/or other facial features, variation in the size and/or shape of the face engager contributes to variations in the alignment of the displays with respect to the eyes 650 of a given user. Based at least in part on the measurements and/or identification of the face engager, alignment data can be determined to indicate the expected position and/or orientation of the displays of the head-mountable device relative to the eyes when the head-mountable device is in use (e.g., worn by the user 610).

In some embodiments, the sensor 512 measures one or more distances to one or more lens assemblies and/or other optical components of the head-mountable device. In some embodiments, the sensor 512 detects and/or identifies the one or more lens assemblies of the head-mountable device. For example, the sensor 512 can identify one or more visible features (e.g., barcode, label, icon, QR code) of the one or more lens assemblies. By further example, the sensor 512 can communicate (e.g., wirelessly) with a component (e.g., RFID tag, NFC tag, and the like) of the one or more lens assemblies. Based on such measurements and/or identifications, the location, shape, size, width, length, and/or angle of the one or more lens assemblies can be calculated and/or otherwise determined. The selection (and/or absence) of the one or more lens assemblies and its features can contribute to how the displays of a head-mountable device will be aligned (e.g., with relative position and/or orientation) with respect to the eyes 650 of the user 610. For example, the presence, absence, and/or selection of different lens assemblies can alter an effective distance between the eyes and the optical assembly (e.g., including the displays and/or the lens assemblies). By further example, the presence, absence, and/or selection of different lens assemblies can alter a perceived distance to visual content output by the displays. Based at least in part on the measurements and/or identification of the one or more lens assemblies, alignment data can be determined to indicate the expected position and/or orientation of the displays (and/or one or more lens assemblies) of the head-mountable device relative to the eyes when the head-mountable device is in use (e.g., worn by the user 610).

It should be understood that any one or more of the measurements described herein can be taken and combined for an overall determination of alignment data, adjustment data, and/or one or more other items of data for use by the head-mountable device. Such measurements can be taken in any sequence and across any amount of time.

Figure 4:
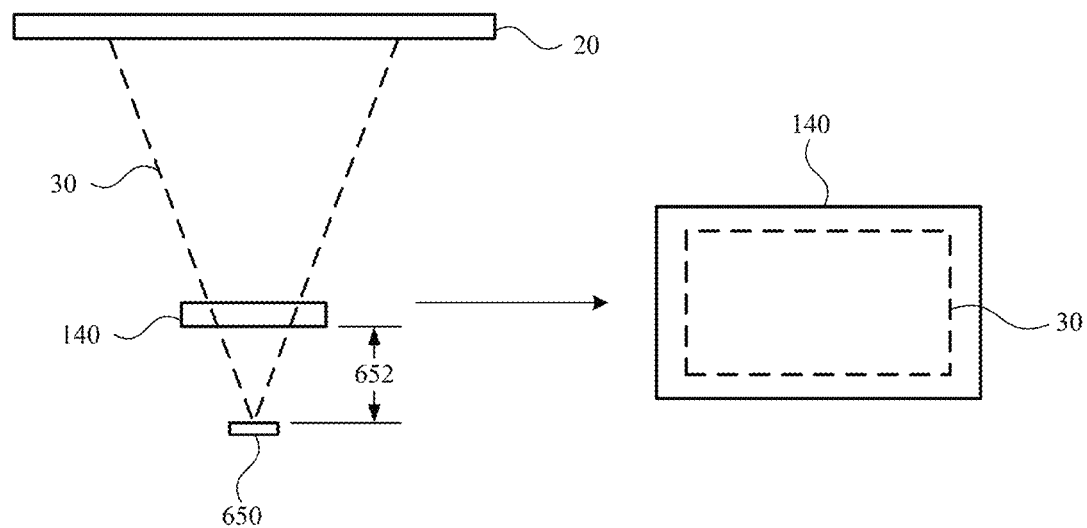
FIG. 4 illustrates a schematic view of a display at a first distance away from an eye and within a field of view of the eye, according to some embodiments of the present disclosure.
Figure 5:
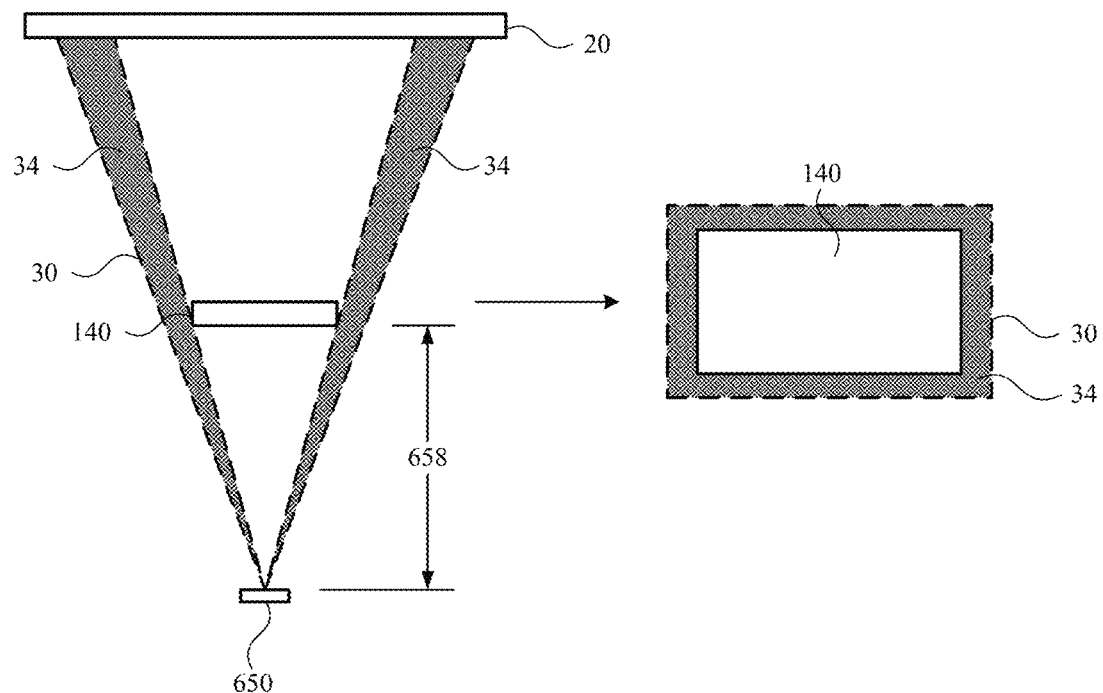
FIG. 5 illustrates a schematic view of the display of FIG. 4 at a second distance away from the eye of FIG. 4 and within the field of view of the eye, according to some embodiments of the present disclosure.

Referring now to FIGS. 4-5, a distance (e.g., depth) between an eye and a display and/or other optical elements can influence a relationship between a field of view of the eye and a user's perception of a display within the field of view. As shown in FIG. 4, an eye 650 can have a field of view 30 corresponding to a frustrum extending from the eye 650. A display 140 can be provided with at least a portion thereof within the field of view 30 of the eye 650. The display 140 can provide an output that projects an image 20 at a particular distance. It will be understood that the physical location of the display 140 can be different from the location at which the image 20 is projected, such that the user's perception of the location of the image 20 is different from (e.g., farther away than) the physical location of the display 140. While only one eye 650 and one display 140 are illustrated, it will be understood that the concept illustrated herein can apply to multiple (e.g., a pair of) eyes and multiple (e.g., a pair of) displays, wherein each display is provided with at least a portion thereof within a respective field of view of the respective eye.

The optical distance 658 can correspond to a position of the display 140 relative to the eye 650 when the head-mountable device is worn by the user. As described herein, the optical distance 658 can be influenced by a variety of factors, such as one or more features of a head (e.g., eyes and/or nose) of the user and/or one or more features (e.g., face engager and/or lens assemblies) of the head-mountable device. In some embodiments, for a given user and a given assembly of the head-mountable device, the optical distance 658 can be fixed and estimated based on one or more detections and/or measurement, as described herein.

In some embodiments, a smaller optical distance 658 may result from a shorter nose, a thinner face engager, and/or a thicker lens assembly. As shown on the left side of FIG. 4, the eye 650 can be a particular (e.g., relatively smaller) optical distance 658 away from the display 140 and/or one or more other optical elements associated with the display 140 (e.g., lens assemblies). As shown on the right side of FIG. 4, for at least one (e.g., relatively smaller) optical distance 658 between the eye 650 and the display 140, the display 140 can be entirely within the field of view 30 of the eye 650. As such, the output provided by the display 140 can occupy an entirety of the field of view 30, thereby avoiding any perceived regions outside of the display 140. However, the field of view 30 may not encompass an entirety of the display 140. As such, at least a portion of the display 140 and/or visual content output thereon may not be observed or perceived by the user unless the visual content is adjusted, as described below.

In some embodiments, a larger optical distance 658 may result from a longer nose, a thicker face engager, and/or a thinner lens assembly. As shown on the left side of FIG. 5, the eye 650 can be a different (e.g., relatively larger) optical distance 658 away from the display 140 and/or one or more other optical elements associated with the display 140 (e.g., lens assemblies). As shown on the right side of FIG. 5, for at least one (e.g., relatively larger) optical distance 658 between the eye 650 and the display 140, the display 140 can occupy less than the entirety of the field of view 30 of the eye 650. As such, the output provided by the display 140 can occupy less than the entirety of the field of view 30, thereby allowing for peripheral regions 34 to exist outside of the display 140. These regions may be perceived by the user without having a corresponding output to provide visual content threat. Such peripheral regions may further allow for differences between the perceived outputs of visual content on different displays, as described below.

Figure 6:
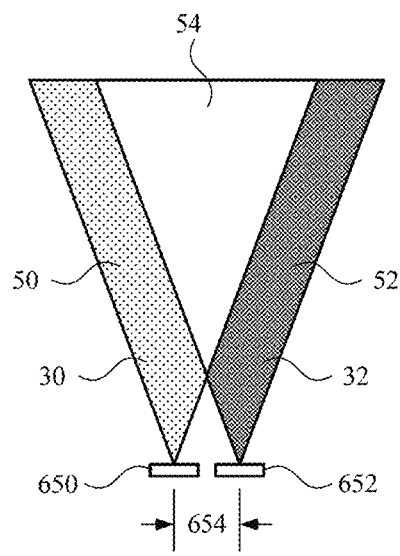
FIG. 6 illustrates a schematic view of eyes with respective fields of view illustrated as frustra that are in parallel with each other, according to some embodiments of the present disclosure.
Figure 7:
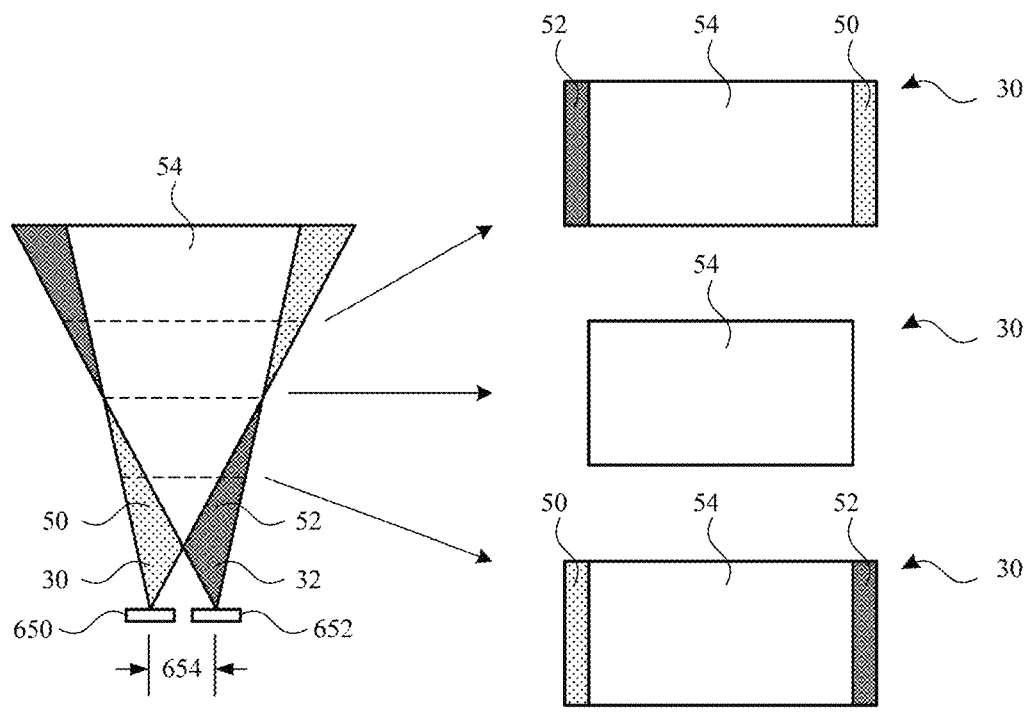
FIG. 7 illustrates a schematic view of the eyes of FIG. 6 with respective fields of view illustrated as frustra that are not parallel with each other (e.g., are converging or diverging), according to some embodiments of the present disclosure.

Referring now to FIGS. 6-7, an alignment (e.g., of respective separation distances) between displays and respective eyes can further influence a relationship between a field of view of the eye and a user's perception of a display within the field of view. As shown in FIG. 6, a pair of eyes 650 and 652 can have respective fields of view 30 and 32, each corresponding to a frustrum extending from the respective eye 650 or 652. Displays (not shown) can be provided with at least a portion thereof within a respective field of view of the respective eye. In one arrangement of the displays, the eyes 650 and 652 can be allowed to observe with fields of view 30 and 32 (and/or axes thereof) that extend in parallel. For example, displays in a preferred alignment with the eyes 650 and 652 can result in pathways from the eyes 650 and 652 to the respective displays that are parallel with each other. In such a condition, the fields of view 30 and 32 have a maximum overlapping region at an infinite distance away from the eyes 650 and 652. Each of the fields of view 30 and 32 may have an overlapping portion 54 and at least one peripheral portion 50 and 52, respectively, that does not overlap with the other one of the fields of view 30 and 32. Each peripheral portion 50 and 52 can be on a side of an overlapping portion 54. However, with a preferred alignment of the displays, the peripheral portions 50 and 52 can remain at a consistent side and proportion of the binocular vision provided by the eyes 650 and 652.

However, where the displays of a head-mountable device are not in a preferred alignment, the user's perception of display visual content may be different. A given user can have an interpupillary distance 654. For a given interpupillary distance 654, there may be a preferred separation distance (see separation distance 144 of FIG. 2) between the displays of a head-mountable device. In some embodiments, a head-mountable device may have a fixed separation distance between the displays thereof. In some embodiments, a head-mountable device may have only a limited number of discrete separation distances between the displays thereof. In some embodiments, a head-mountable device may a limited ability to determine and/or provide the preferred separation distance between the displays thereof. Accordingly, it can be beneficial to consider how the output of such displays can compensate by providing determining alignment data, determining adjustment data, and/or outputting visual content based on the adjustment data.

In another arrangement of the displays, the eyes 650 and 652 can observe with fields of view 30 and 32 (and/or axes thereof) that diverge or converge. For example, displays in a non-preferred alignment with the eyes 650 and 652 can result in pathways from the eyes 650 and 652 to the respective displays that are not parallel with each other. In such a condition, the fields of view 30 and 32 have variable overlapping regions at different distances away from the eyes 650 and 652. As shown on the right side of FIG. 7, each of the fields of view 30 and 32 may have a peripheral portion 50 and 52, respectively, that does not overlap with the other one of the fields of view 30 and 32. Each peripheral portion 50 and 52 can be on a side of the overlapping portion 54. With a non-preferred alignment of the displays, the peripheral portions 50 and 52 are on different sides of the common portion 54 at different distances away from the eyes 650 and 652. Further, with a non-preferred alignment of the displays, the peripheral portions 50 and 52 occupy different proportions of the binocular vision provided by the eyes 650 and 652 at different distances away from the eyes 650 and 652. This can cause the eyes 650 and 652 to perceive visual content output by the different displays differently, even when the visual content is identical. This can result in the perception of artifacts, rivalry, and/or luning when the user uses binocular vision. While there may be at least one distance at which the displays provide minimal peripheral portions 50 and 52 (e.g., minimal artifacts), the displays may not be located at such a distance, based on the factors described herein. Nonetheless, by determining the distance at which the displays are located away from the eyes 650 and 652, the output of the displays can be adjusted to output visual content for which the eyes 650 and 652 will perceive consistency and agreement, rather than rivalry and/or luning.

Figure 8:
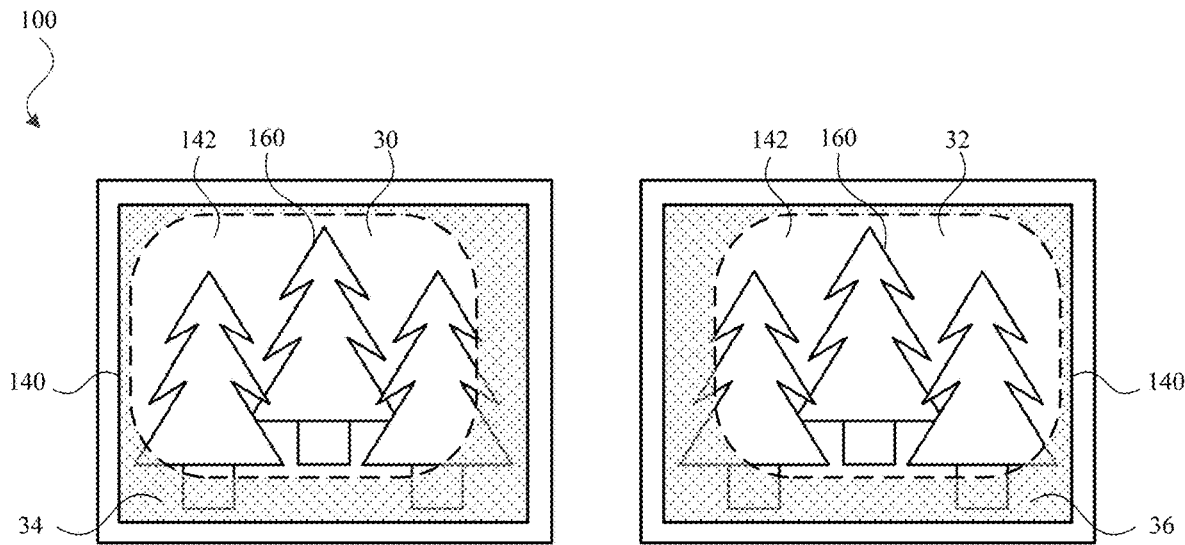
FIG. 8 illustrates a head-mountable device with a pair of displays outputting respective examples of user interfaces along with the fields of view of respective eyes, according to some embodiments of the present disclosure.

Referring now to FIGS. 8-11, a head-mountable device can provide a user interface to output (e.g., display) visual content to a user during use of the head-mountable device. FIG. 8 illustrates a front view of a head-mountable device 100 operable by a user, the head-mountable device 100 providing a user interface 142 with each of two different displays 140 thereof, according to some embodiments of the present disclosure. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

As shown in FIG. 8, the displays 140 can output (e.g., display) first visual content 160 (e.g., original visual content and/or visual content output in a first manner) with the respective user interfaces 142 thereof. Each eye of the user can provide a respective field of view 30 and 32. Depending on the optical distances (e.g., a distance between of a display 140 and an eye) and the alignment (e.g., presence or absence of displacement) of the display 140 with respect to the field of view 30 or 32 (e.g., frustrum and/or central axis) of the eye, the fields of view 30 and 32 may perceive different portions of the first visual content 160 and/or perceive the first visual content differently. For example, where the optical distances are sufficiently small and the displays 140 are not in a preferred alignment with the eyes (e.g., centered on a central axis of the fields of view 30 and 32), each eye may be unable to perceive one or more peripheral regions 34 and 36 of the respective displays 140. Such peripheral regions 34 and 36 correspond to regions that are outside the respective fields of view 30 and 32.

In some embodiments, as shown in FIG. 8, the regions of the first visual content 160 that are within the respective fields of view 30 and 32 can differ. Likewise, the regions of the first visual content 160 that are outside the respective fields of view 30 and 32 (e.g., within the peripheral regions 34 and 36) can differ. For example, a left eye will be able to perceive a different portion of the first visual content 160 then will a right side. Accordingly, due to such differences, the user can perceive artifacts (e.g., rivalry and/or luning) based on binocular vision. While the fields of view 30 and 32 are illustrated as having a discrete boundary, it will be understood that the perceive differences can be a matter of gradually darkening areas (e.g., gradients) at a periphery of a respective field of view. This can cause one eye to perceive certain portions of the visual content differently than the other eye does. It can be desirable to remove such effects by adjusting the output of the visual content.

Figure 9:
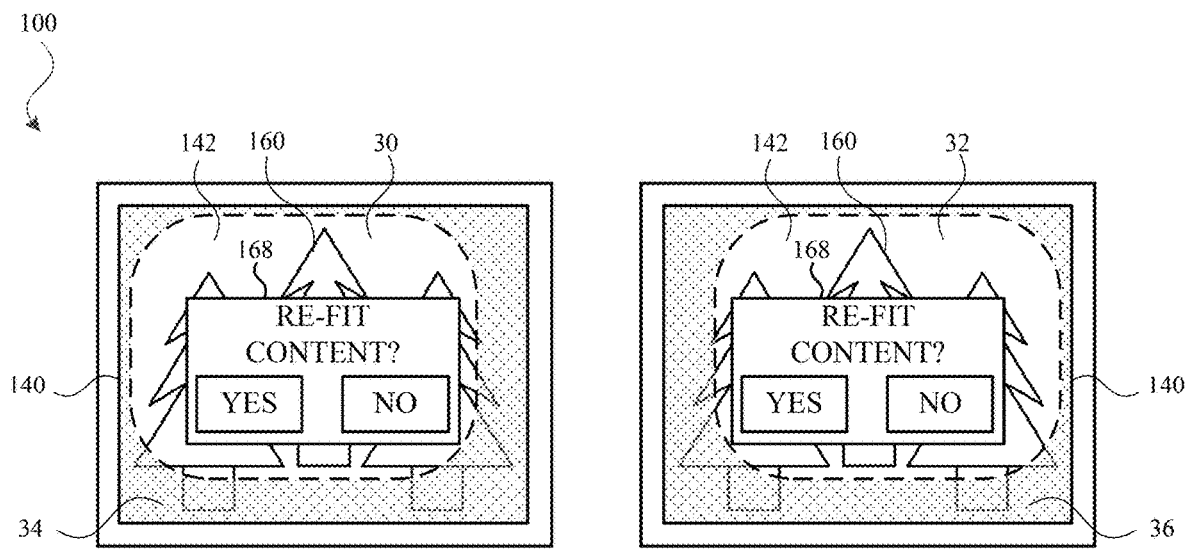
FIG. 9 illustrates the head-mountable device of FIG. 8 with the pair of displays outputting other respective examples of user interfaces, according to some embodiments of the present disclosure.

In some embodiments, as shown in FIG. 9, the user interfaces 142 can output (e.g., display) one or more prompts 168 to solicit a user input regarding whether to apply an adjustment to the first visual content 160. A user can provide an input corresponding to a command to adjust the first visual content or an input corresponding to a command to maintain the first visual content. While the prompt 168 is illustrated as a visual and/or graphical element, it will be understood that prompts can include audio outputs and the like. In response to the user input and in accordance with a determination that the user input corresponds to a command to maintain the first visual content 160 (and/or in response to no user input), the first visual content 160 can be maintained. In response to the user input and in accordance with a determination that the user input corresponds to a command to adjust the first visual content 160, the first visual content 160 can be adjusted, as described further herein. It will be understood that one or more other criteria can be applied to determine whether to adjust the visual content, as described further herein.

Figure 10:
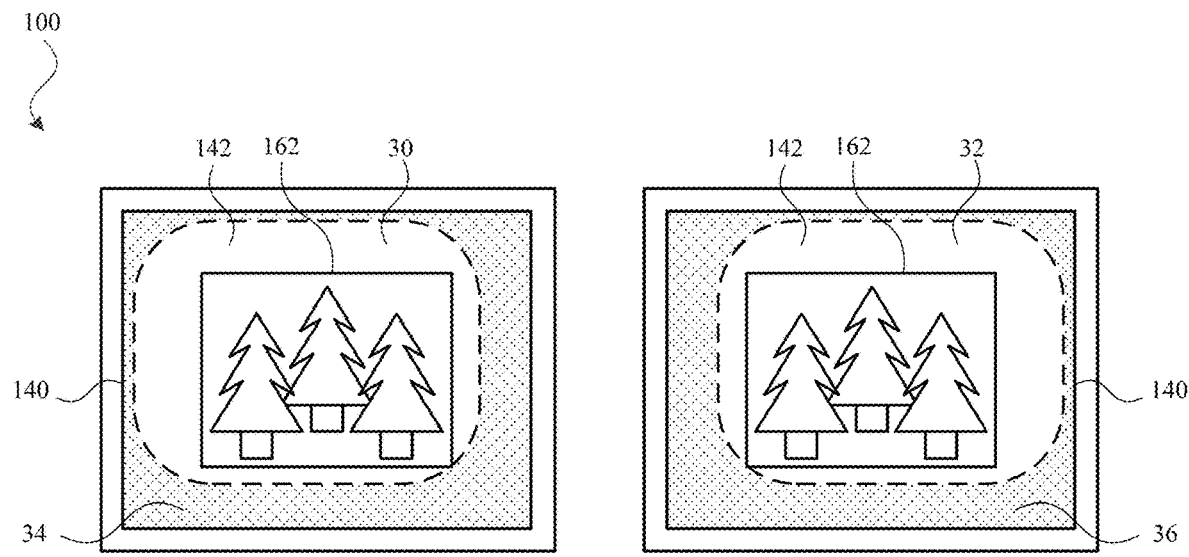
FIG. 10 illustrates the head-mountable device of FIGS. 8 and 9 with the pair of displays outputting other respective examples of user interfaces with adjusted content, according to some embodiments of the present disclosure.

In some embodiments, as shown in FIG. 10, the displays 140 can output (e.g., display) second visual content 162 (e.g., adjusted visual content and/or visual content output in a second manner) with the respective user interfaces 142 thereof. In some embodiments, the second visual content 162 is an adjustment of the first visual content 160. In some embodiments, the active region of the displays 140 is limited (e.g., cropped) to be within the respective fields of view 30 and 32. In some embodiments, the second visual content 162 is an adjustment (e.g., scaling and/or reduction) of the size of the first visual content 160. The adjustment can be applied to some or all of the first visual content 160 to produce the second visual content 162. For example, the adjustments (e.g., cropping and/or scaling) can be partial, so that a greater proportion of the second visual content 162 is within the fields of view 30 and 32 (e.g., relative to the first visual content 160), even if some of the second visual content 162 is outside the fields of view 30 and 32. By further example, the adjustments can be such that an entirety of the second visual content 162 (e.g., corresponding to the first visual content 160) is within the fields of view 30 and 32. As shown in FIG. 10, the second visual content 162 in each of the user interfaces 142 can be the same (e.g., visually identical), for example to be within the respective fields of view 30 and 32. Accordingly, the user can avoid perceiving any artifacts (e.g., rivalry and/or luning) based on binocular vision.

Figure 11:
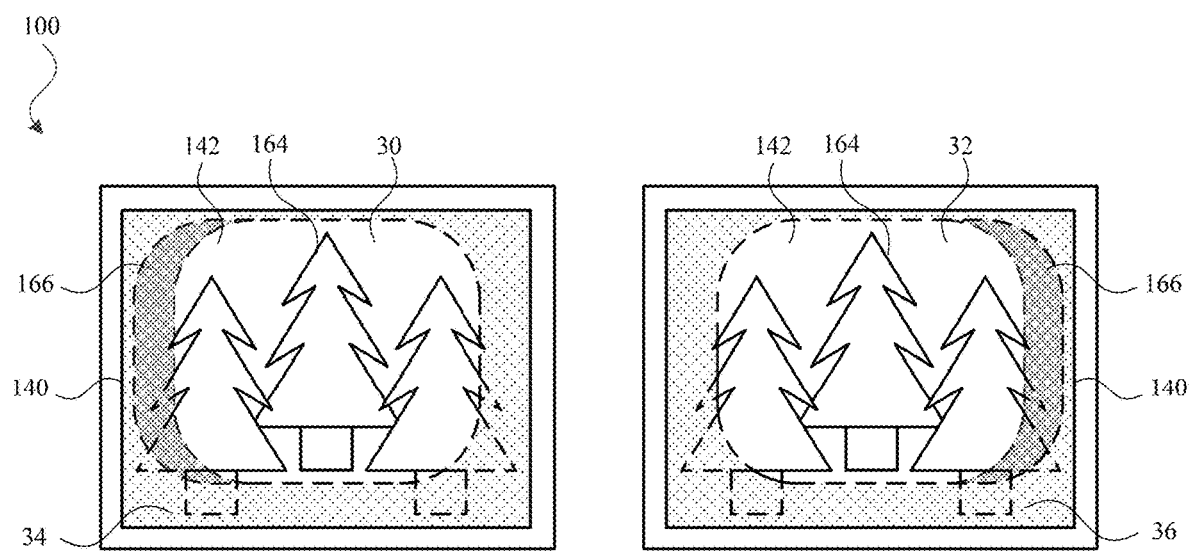
FIG. 11 illustrates the head-mountable device of FIG. 8 with the pair of displays outputting other respective examples of user interfaces with adjusted content, according to some embodiments of the present disclosure.

In some embodiments, as shown in FIG. 11, the displays 140 can output (e.g., display) third visual content 164 (e.g., adjusted visual content and/or visual content output in a third manner) with the respective user interfaces 142 thereof. In some embodiments, the third visual content 164 is an adjustment of the first visual content 160. In some embodiments, the active region of the displays 140 is limited (e.g., cropped) to be within the respective fields of view 30 and 32. The adjustment can be applied to some or all of the first visual content 160 to produce the third visual content 164. For example, the head-mountable device 100 can apply a mask 166 to occlude and/or omit output of a portion of the first visual content to result in the third visual content 164. As shown in FIG. 11, the third visual content 164 in each of the user interfaces 142 can be the same (e.g., visually identical), for example to be within the respective fields of view 30 and 32. The third visual content 164 (e.g., by virtue of the mask 166) can omit any visual content that would be outside the respective fields of view 30 and 32 (e.g., within the peripheral regions 34 and 36). While the mask 166 is illustrated as a discrete boundary, it will be understood that a number is visual effects can be applied, such as a gradually darkening areas (e.g., gradients) near a periphery of a respective field of view. Other effects include feathering, fading, and the like. Such effects can be selected and applied on one display 140 to mimic the natural perception the occurs with respect to the other display 140. Accordingly, the user can avoid perceiving any artifacts (e.g., rivalry and/or luning) based on binocular vision.

Figure 12:
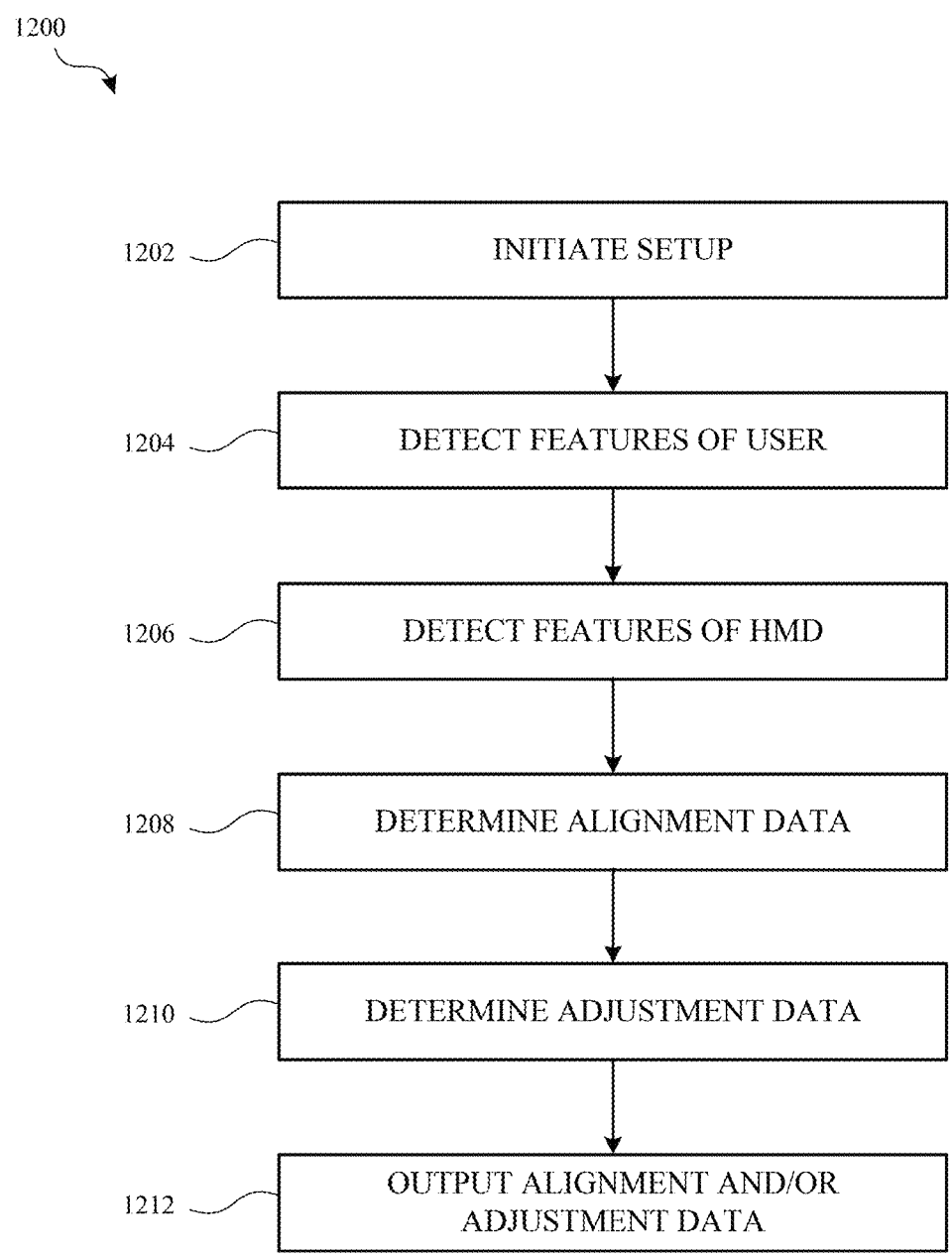
FIG. 12 illustrates a flow chart for a process having operations for performing one or more detections with an electronic device, according to some embodiments of the present disclosure.

FIG. 12 illustrates a flow diagram of an example process 1200 for determining alignment data and/or adjustment data for user by a head-mountable device. For explanatory purposes, the process 1200 is primarily described herein with reference to the electronic device 500. However, the process 1200 is not limited to the electronic device 500, and one or more blocks (or operations) of the process 1200 may be performed by different devices (e.g., the head-mountable device and/or one or more other devices). Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

The process 1200 can begin when the electronic device initiates a procedure for detecting a head of a user to measure features thereof and/or a head-mountable device to measure features thereof (1202). Such a detection can be made by one or more sensors of the electronic device. In some embodiments, the detection can be performed in response to an interaction between the electronic device and the head-mountable device, such as a connection there between. In some embodiments, the detection can be performed in response to a user input (e.g., at the electronic device and/or the head-mountable device).

In some embodiments, the electronic device detects a head of a user to measure features thereof (1204). Such a detection can be made by one or more sensors of the electronic device. In some embodiments, a sensor of the electronic device can measure one or more distances to one or more regions of the head. Such regions can include a nose and/or one or both eyes of the user. It should be understood that such measurements and/or detections can be made simultaneously and/or at different times.

In some embodiments, the electronic device detects a head-mountable device to measure features thereof (1206). Such a detection can be made by one or more sensors of the electronic device. In some embodiments, a sensor of the electronic device can measure one or more distances to one or more components of the head-mountable device. Such components can include a face engager and/or one or more lens assemblies. In some embodiments, a sensor of the electronic device can identify one or more components of the head-mountable device, such as by optical detection, wireless communication, and the like. It should be understood that such measurements and/or detections can be made simultaneously and/or at different times.

In some embodiments, based on the measured distances and/or the detected features of the user and/or the head-mountable device, the electronic device and/or another device can determine alignment data for a head-mountable device (1208). The alignment data can correspond to positions of the one or more displays relative to respective ones of the one or more eyes when the head-mountable device is in use. Any combination of the measurements, detections, and/or identifications described herein can be applied to generate alignment data. In some embodiments, the alignment data is generated by the head-mountable device based on one or more detections performed by the electronic device.

In some embodiments, based on the alignment data (and/or other data), the electronic device and/or another device can determine adjustment data for a head-mountable device (1210). The alignment data can correspond to a difference between portions of the visual content that would be within separate fields of view of (and/or be perceived differently by) the one or more eyes when the visual content is output in a first manner by the one or more displays of the head-mountable device. The alignment data can correspond to an adjustment to adjust, alter, and/or omit at least a portion of the visual content. In some embodiments, the adjustment data is generated by the head-mountable device based on one or more detections performed by the electronic device.

In some embodiments, the electronic device and/or another device can output the alignment data and/or the adjustment data, for example, to the head-mountable device (1212).

Figure 13:
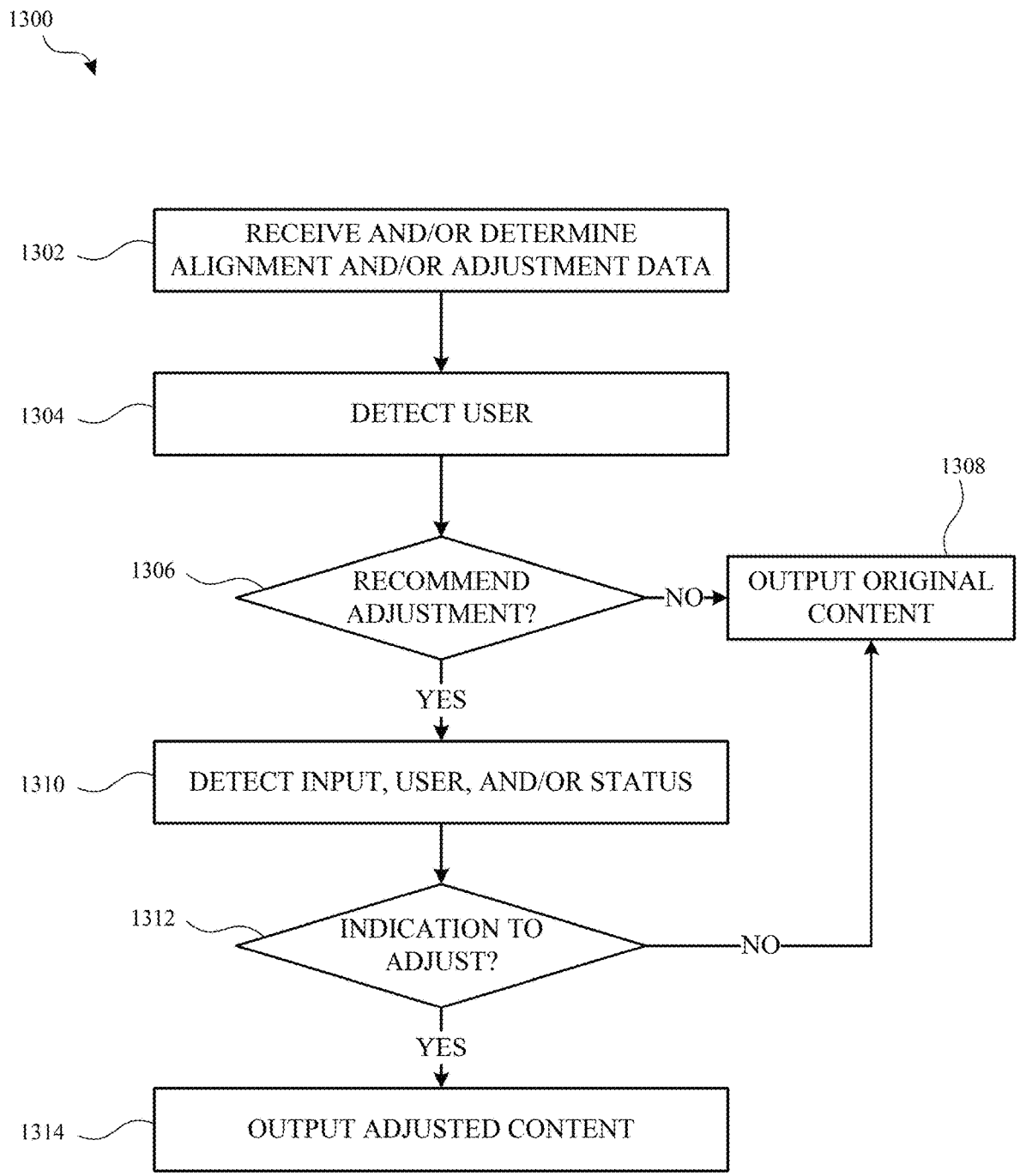
FIG. 13 illustrates a flow chart for a process having operations for outputting content (e.g., adjusted content) with a head-mountable device, according to some embodiments of the present disclosure.

FIG. 13 illustrates a flow diagram of an example process 1300 for managing output of visual content at a head-mountable device. For explanatory purposes, the process 1300 is primarily described herein with reference to the head-mountable device 100. However, the process 1300 is not limited to the head-mountable device 100, and one or more blocks (or operations) of the process 1300 may be performed by different devices (e.g., the electronic device and/or one or more other devices). Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The process 1300 can begin when the head-mountable device initiates a procedure for outputting visual content (1302). In some embodiments, the head-mountable device receives alignment data and/or adjustment data from another device, such as the electronic device. In some embodiments, the procedure can be performed in response to an interaction between the head-mountable device and the electronic device, such as a connection there between. In some embodiments, the head-mountable device determines the alignment data and/or the adjustment data, for example without requiring the transmission of such data from another device, such as the electronic device. In some embodiments, the procedure can be performed in response to a user input (e.g., at the head-mountable device and/or the electronic device).

In some embodiments, the head-mountable device detects a user (1304). Such a detection can be made by one or more sensors of the head-mountable device. In some embodiments, a sensor of the head-mountable device can measure one or more distances to one or more regions of the head. In some embodiments, a sensor of the head-mountable device can identify a user from among other possible users. Such identification can include and/or be based on detections performed by and/or inputs received at the head-mountable device and/or the electronic device.

In some embodiments, the head-mountable device determines whether an adjustment to visual content is recommended (1306). In some embodiments, an adjustment to visual content is recommended where the alignment data indicates that a difference between portions of the visual content would occur within separate fields of view of (and/or would be perceived by) the one or more eyes when visual content is output in a first manner (e.g., as original visual content) by the one or more displays of the head-mountable device. Accordingly, the alignment data can correspond to an adjustment to adjust, alter, and/or omit at least a portion of the visual content. In some embodiments, an adjustment to visual content is not recommended where the alignment data indicates that no difference (and/or not exceeding a threshold) between portions of the visual content would occur within the separate fields of view of (and/or would be perceived by) the one or more eyes when the visual content is output in the first manner (e.g., as original visual content) by the one or more displays of the head-mountable device.

In some embodiments, where no adjustment is recommended (e.g., where the visual content output in a first manner would not result in perceived differences between the fields of view of the eyers of the user), the head-mountable device outputs the visual content in the first manner (e.g., as original or unadjusted visual content) (1308) and/or the process 1300 proceeds to another block, operation, and/or process In some embodiments, where an adjustment is recommended (e.g., where the visual content output in a first manner would result in perceived differences between the fields of view of the eyers of the user), the head-mountable device detects one or more conditions (1310). In some embodiments, the head-mountable device can prompt a user to provide an input that either accepts or rejects the recommended adjustment. In some embodiments, the head-mountable device can detect a user and determine whether the detected user is associated with a user profile that includes a setting to either accept or reject the recommended adjustment. For example, the head-mountable device can identify a user with one or more sensors thereof. By further example, the head-mountable device can identify a user with one or more inputs and/or credential provided and/or detect at the electronic device (e.g., while communicatively connected to the head-mountable device). In some embodiments, the head-mountable device can detect a status of the head-mountable device and determine whether the detected status is associated with a setting to either accept or reject the recommended adjustment. For example, different applications and/or types of applications that are operating on the head-mountable device (e.g., indicating a status) can result in the head-mountable device accepting or rejecting the recommended adjustment. By further example, different visual content and/or types of visual content (e.g., virtual content, captured views of physical items from a physical environment, text, images, videos, etc.) that are for output (e.g., display) with the head-mountable device (e.g., indicating a status) can result in the head-mountable device accepting or rejecting the recommended adjustment. One or more of the settings described herein (e.g., to either accept or reject the recommended adjustment) can be user-selected, based on a prior interaction, and/or system generated (e.g., as a default setting).

In some embodiments, the head-mountable device determines whether a detected condition is associated with an indication to adjust the visual content (1312). For example, as described herein, the detected condition can be associated with an input and/or setting to accept or reject the recommended adjustment to the visual content. In some embodiments, where the detected condition is associated with an indication to adjust the visual content, the process 1300 proceeds to block 1314 and/or another block, operation, and/or process. In some embodiments, where the detected condition is not associated with an indication to adjust the visual content, the process 1300 proceeds to block 1308 and/or another block, operation, and/or process.

In some embodiments, where the detected condition is associated with an indication to adjust the visual content, the head-mountable device outputs adjusted visual content (e.g., outputs the visual content in a second manner different from the first manner) (1314). The output of adjusted visual content and/or visual content in the second manner can include a change to the visual content with respect to one or more of a size, position, orientation, aspect ratio, inclusion, omission, cropping, and the like. With the adjustment, the head-mountable device can omit a difference that would have occurred between portions of visual content that would be within separate fields of view of the one or more eyes when the visual content is output by the one or more displays of the head-mountable device.

Figure 14:
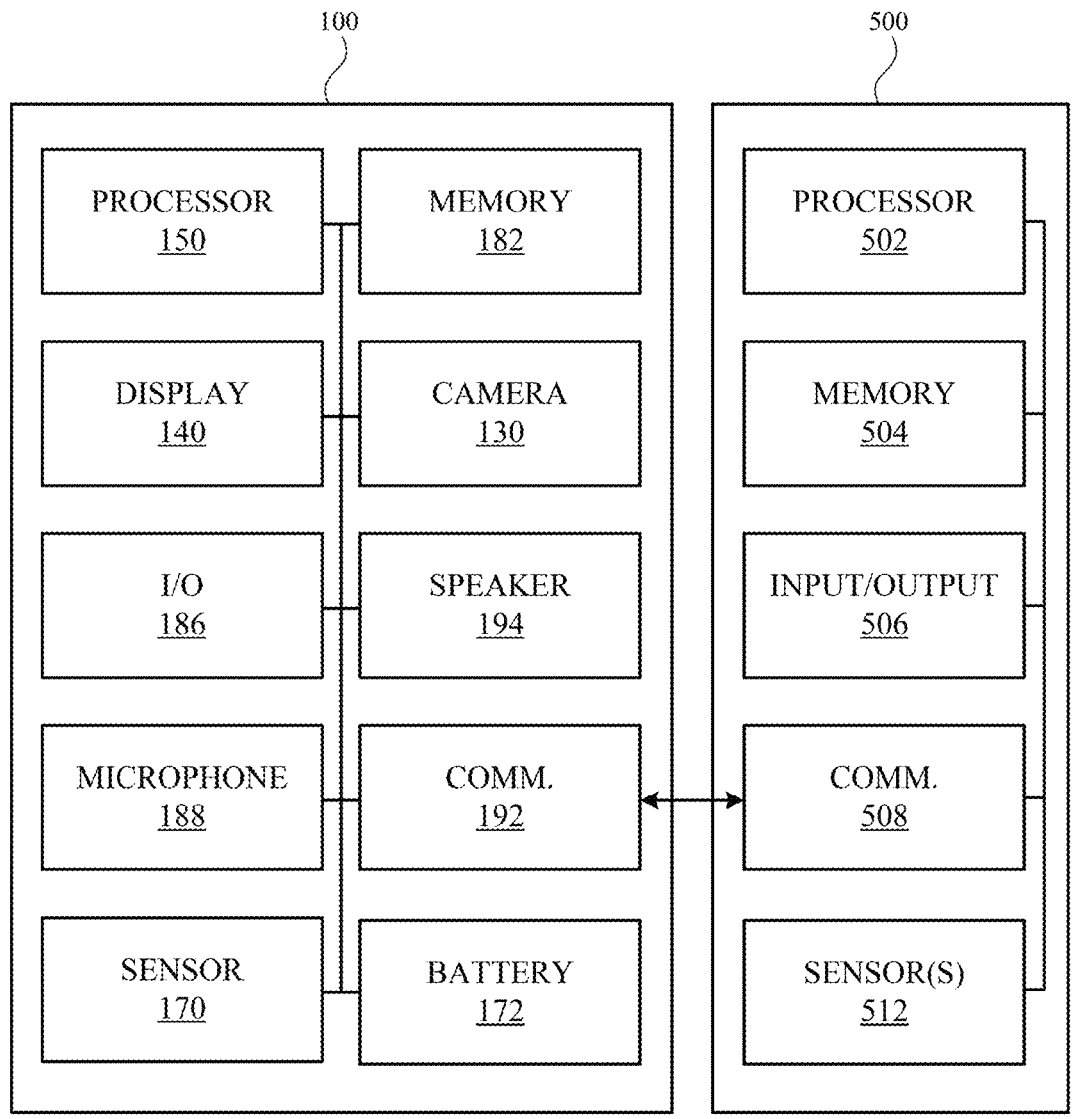
FIG. 14 illustrates a block diagram of an assembly system, in accordance with some embodiments of the present disclosure.

Referring now to FIG. 14, components of the head-mountable device and/or the electronic device can be operably connected to provide the performance described herein. FIG. 14 shows a simplified block diagram of an illustrative head-mountable device 100 in accordance with one embodiment of the invention. It will be appreciated that components described herein can be provided on one, some, or all of a frame, a face engager, a lens assembly, and/or a head engager. It will be understood that additional components, different components, or fewer components than those illustrated may be utilized within the scope of the subject disclosure.

As shown in FIG. 14, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include one or more displays 140 for displaying visual information for a user. A display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can include one or more sensors 170, such as the sensors of a sensor assembly, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image-based content of the outside world.

The head-mountable device 100 can include an input/output component 186, which can include any suitable component for receiving input from a user and/or providing output to a user. The input/output component 186 can include buttons, keys, a touchscreen, a keyboard, a mouse, a microphone, a camera, and the like.

The head-mountable device 100 can include the microphone 188 as described herein. The microphone 188 can be operably connected to the processor 150 for detection of sound levels and communication of detections for further processing, as described further herein.

The head-mountable device 100 can include the speakers 194 as described herein. The speakers 190 can be operably connected to the processor 150 for control of speaker output, including sound levels, as described further herein.

The head-mountable device 100 can include a communication interface 192 for communicating with one or more servers or other devices (e.g., electronic device 500) using any suitable communications protocol. For example, the communication interface 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication interface 192 can also include an antenna for transmitting and receiving electromagnetic signals.

The head-mountable device 100 can include a battery 172, which can charge and/or power components of the head-mountable device 100. The battery 172 can also charge and/or power components connected to the head-mountable device 100.

Referring again to FIG. 14, components of the electronic device 500 can be provided and operatively connected to achieve the performance described herein. The electronic device 500 may include, among other components, a processor 502, a memory 504, one or more input/output devices 506, a communication interface 508, and/or one or more sensors 512.

The processor 502, which may also be referred to as an application processor or a processor, may include suitable logic, circuitry, and/or code that enable processing data and/or controlling operations of the electronic device 500. In this regard, the processor 502 may be enabled to provide control signals to various other components of the electronic device 500. The processor 502 may also control transfers of data between various portions of the electronic device 500. Additionally, the processor 502 may enable implementation of an operating system or otherwise execute code to manage operations of the electronic device 500. The memory 504 may include suitable logic, circuitry, and/or code that enable storage of various types of information such as received data, generated data, code, and/or configuration information. The memory 504 may include, for example, random access memory (RAM), read-only memory (ROM), flash, and/or magnetic storage.

The input/output devices 506 can include any suitable component for providing interaction with a user and/or another device. The input/output devices 506 can include one or more buttons, keys, microphones, cameras, and the like. The input/output devices 506 can one or more displays, speakers, haptic feedback devices, and the like.

The electronic device 500 can include a communication interface 508 for communicating with one or more servers or other devices (e.g., head-mountable device 100) using any suitable communications protocol. For example, the communication interface 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication interface 508 can also include an antenna for transmitting and receiving electromagnetic signals.

The one or more sensors 512 may include, for example, one or more image sensors, one or more depth sensors, one or more infrared sensors, one or more thermal (e.g., infrared) sensors, and/or generally any sensors that may be used to detect and/or measure features of a head of a user and/or features of a head-mountable device.

Accordingly, embodiments of the present disclosure provide a provide a head-mountable device with interface elements to provide output of adjusted visual content. The head-mountable device and/or another electronic device can be operated to detect features of a user and/or features of the head-mountable device to determine alignment data corresponding to the alignment of the eyes with the displays. The head-mountable device and/or the other electronic device can be operated to determine adjustment data that indicates whether the user's perception of the visual content will differ between the fields of view of the eyes. The adjustment data can further indicate how output of the visual content can be adjusted so that the portions of the visual content that are output with the displays omits differences that would interfere with the user's perception of the visual content.

Various examples of aspects of the disclosure are described below as clauses for convenience. These are provided as examples, and do not limit the subject technology.

Clause A: an electronic device comprising: one or more sensors configured to detect one or more features of one or more eyes and one or more features of a head-mountable device; a processor configured to, in response to one or more detections of the one or more eyes and one or more detections of the one or more features of the head-mountable device, determine adjustment data corresponding to a recommended adjustment to an output of visual content based on an alignment of the one or more eyes with respect to one or more displays of the head-mountable device; and a communication interface configured to transmit the adjustment data to the head-mountable device.

Clause B: a head-mountable device comprising: multiple displays configured to output visual content; and a processor configured to: determine alignment data corresponding to positions of the displays relative to respective eyes when the head-mountable device is in use; based on the alignment data, determine adjustment data corresponding to an adjustment to omit a difference between portions of the visual content that would be within separate fields of view of the respective eyes when the visual content is output by the multiple displays in a first manner; and based on the adjustment data and with the multiple displays, output the visual content in a second manner different from the first manner such that the visual content is within each of the separate fields of view of the respective eyes.

Clause C: a method comprising: detect one or more features of one or more eyes; detect one or more features of a head-mountable device; in response to a detection of the one or more features of the one or more eyes and a detection of the one or more features of the head-mountable device, determine alignment data; based on the alignment data, determine adjustment data corresponding to an recommended adjustment to an output of visual content by one or more displays of the head-mountable device; and based on the adjustment data and with the one or more displays, output the visual content.

One or more of the above clauses can include one or more of the features described below. It is noted that any of the following clauses may be combined in any combination with each other, and placed into a respective independent clause, e.g., Clause A, B, or C.

Clause 1: the adjustment data corresponds to an adjustment to omit a difference between portions of visual content that would be within separate fields of view of the one or more eyes when the visual content is output by the one or more displays of the head-mountable device.

Clause 2: the processor is configured to transmit, with the communication interface, an instruction to the head-mountable device to output, with the one or more displays, adjusted visual content such that the adjusted visual content is within each of the separate fields of view of the respective eyes.

Clause 3: the one or more sensors are configured to detect the one or more features of the one or more eyes by detecting: a distance to each of the one or more eyes; and a distance to a nose adjacent to the eyes.

Clause 4: the one or more sensors are configured to detect the one or more features of the head-mountable device by detecting: one or more features of a face engager of the head-mountable device; and one or more features of a lens assembly of the head-mountable device.

Clause 5: the one or more sensors include a depth sensor, an image sensor, or an infrared sensor.

Clause 6: the visual content is virtual content.

Clause 7: the processor is configured to output the visual content in the second manner by reducing a size of the visual content to fit within a common portion of each of the multiple displays, the common portion being within each of the separate fields of view of the respective eyes.

Clause 8: the processor is configured to output the visual content in the second manner by omitting output of a portion of the visual content that would not be within a common portion of each of the multiple displays, the common portion being within each of the separate fields of view of the respective eyes.

Clause 9: one or more input devices, wherein the processor is configured to: detect, with the one or more input devices, an input; and in response to the input: in accordance with a determination that the input corresponds to a command to adjust the visual content, output the visual content in the second manner; and in accordance with a determination that the input does not correspond to the command to adjust the visual content, output the visual content in the first manner.

Clause 10: one or more sensors, wherein the processor is configured to: detect, with the one or more sensors, a user wearing the head-mountable device; retrieve a profile corresponding to the user; in accordance with a determination that the profile includes a setting to adjust the visual content, output the visual content in the second manner; and in accordance with a determination that the profile does not include a setting to adjust the visual content, output the visual content in the first manner.

Clause 11: the processor is configured to: Detect an application running on the head-mountable device; in accordance with a determination that the application is a first type of application, output the visual content in the first manner; and in accordance with a determination that the application is a second type of application, output the visual content in the second manner.

Clause 12: one or more sensors wherein the processor is configured to determine the alignment data by: detecting, with the one or more sensors, one or more features of the eyes; and detecting, with the one or more sensors, one or more features of the head-mountable device.

Clause 13: the one or more sensors are configured to detect the one or more features of the eyes by detecting: a distance from the one or more sensors to each of the eyes; and a distance between the eyes.

Clause 14: the one or more sensors are configured to detect the one or more features of the head-mountable device by detecting: one or more features of a face engager of the head-mountable device; and one or more features of a lens assembly of the head-mountable device, the lens assembly being connected to one of the multiple displays.

Clause 15: the alignment data corresponds to positions of the one or more displays relative to respective ones of the one or more eyes when the head-mountable device is in use.

Clause 16: the adjustment data corresponds to an adjustment to omit a difference between portions of the visual content that would be within separate fields of view of the one or more eyes when the visual content is output in a first manner by the one or more displays of the head-mountable device.

Clause 17: outputting the visual content includes outputting the visual content in a second manner different from the first manner such that the visual content is within each of the separate fields of view of the one or more eyes.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device comprising:
   one or more sensors configured to detect one or more features of one or more eyes and one or more features of a head-mountable device;
   a processor configured to, in response to one or more detections of the one or more eyes and one or more detections of the one or more features of the head-mountable device, determine adjustment data corresponding to a recommended adjustment to an output of visual content based on an alignment of the one or more eyes with respect to one or more displays of the head-mountable device; and
   a communication interface configured to transmit the adjustment data to the head-mountable device.

2. The electronic device of claim 1, wherein the adjustment data corresponds to an adjustment to omit a difference between portions of visual content that would be within separate fields of view of the one or more eyes when the visual content is output by the one or more displays of the head-mountable device.

3. The electronic device of claim 2, wherein the processor is configured to transmit, with the communication interface, an instruction to the head-mountable device to output, with the one or more displays, adjusted visual content such that the adjusted visual content is within each of the separate fields of view of the respective eyes.

4. The electronic device of claim 1, wherein the one or more sensors are configured to detect the one or more features of the one or more eyes by detecting:
   a distance to each of the one or more eyes; and
   a distance to a nose adjacent to the eyes.

5. The electronic device of claim 1, wherein the one or more sensors are configured to detect the one or more features of the head-mountable device by detecting:
   one or more features of a face engager of the head-mountable device; and
   one or more features of a lens assembly of the head-mountable device.

6. The electronic device of claim 1, wherein the one or more sensors include a depth sensor, an image sensor, or an infrared sensor.

7. A head-mountable device comprising:
   multiple displays configured to output visual content; and
   a processor configured to:
   determine alignment data corresponding to positions of the displays relative to respective eyes when the head-mountable device is in use;
   based on the alignment data, determine adjustment data corresponding to an adjustment to omit a difference between portions of the visual content that would be within separate fields of view of the respective eyes when the visual content is output by the multiple displays in a first manner; and based on the adjustment data and with the multiple displays, output the visual content in a second manner different from the first manner such that the visual content is within each of the separate fields of view of the respective eyes.

8. The head-mountable device of claim 7, wherein the visual content is virtual content.

9. The head-mountable device of claim 7, wherein the processor is configured to output the visual content in the second manner by reducing a size of the visual content to fit within a common portion of each of the multiple displays, the common portion being within each of the separate fields of view of the respective eyes.

10. The head-mountable device of claim 7, wherein the processor is configured to output the visual content in the second manner by omitting output of a portion of the visual content that would not be within a common portion of each of the multiple displays, the common portion being within each of the separate fields of view of the respective eyes.

11. The head-mountable device of claim 7, further comprising one or more input devices, wherein the processor is configured to:
  detect, with the one or more input devices, an input; and
  in response to the input:
    in accordance with a determination that the input corresponds to a command to adjust the visual content, output the visual content in the second manner; and
    in accordance with a determination that the input does not correspond to the command to adjust the visual content, output the visual content in the first manner.

12. The head-mountable device of claim 7, further comprising one or more sensors, wherein the processor is configured to:
  detect, with the one or more sensors, a user wearing the head-mountable device;
  retrieve a profile corresponding to the user;
  in accordance with a determination that the profile includes a setting to adjust the visual content, output the visual content in the second manner; and
  in accordance with a determination that the profile does not include a setting to adjust the visual content, output the visual content in the first manner.

13. The head-mountable device of claim 7, wherein the processor is configured to:
  Detect an application running on the head-mountable device;
  in accordance with a determination that the application is a first type of application, output the visual content in the first manner; and
  in accordance with a determination that the application is a second type of application, output the visual content in the second manner.

14. The head-mountable device of claim 7, further comprising one or more sensors wherein the processor is configured to determine the alignment data by:
  detecting, with the one or more sensors, one or more features of the eyes; and
  detecting, with the one or more sensors, one or more features of the head-mountable device.

15. The head-mountable device of claim 14, wherein the one or more sensors are configured to detect the one or more features of the eyes by detecting:
  a distance from the one or more sensors to each of the eyes; and
  a distance between the eyes.

16. The head-mountable device of claim 14, wherein the one or more sensors are configured to detect the one or more features of the head-mountable device by detecting:
  one or more features of a face engager of the head-mountable device; and
  one or more features of a lens assembly of the head-mountable device, the lens assembly being connected to one of the multiple displays.

17. A method comprising:
  detect one or more features of one or more eyes;
  detect one or more features of a head-mountable device;
  in response to a detection of the one or more features of the one or more eyes and a detection of the one or more features of the head-mountable device, determine alignment data;
  based on the alignment data, determine adjustment data corresponding to an recommended adjustment to an output of visual content by one or more displays of the head-mountable device; and
  based on the adjustment data and with the one or more displays, output the visual content.

18. The method of claim 17, wherein the alignment data corresponds to positions of the one or more displays relative to respective ones of the one or more eyes when the head-mountable device is in use.

19. The method of claim 17, wherein the adjustment data corresponds to an adjustment to omit a difference between portions of the visual content that would be within separate fields of view of the one or more eyes when the visual content is output in a first manner by the one or more displays of the head-mountable device.

20. The method of claim 19, wherein outputting the visual content includes outputting the visual content in a second manner different from the first manner such that the visual content is within each of the separate fields of view of the one or more eyes.

* * * * *